US010055016B2

(12) United States Patent
Lee et al.

(10) Patent No.: US 10,055,016 B2
(45) Date of Patent: Aug. 21, 2018

(54) IMAGE DISPLAY APPARATUS AND METHOD FOR OPERATING THE SAME

(71) Applicant: LG ELECTRONICS INC., Seoul (KR)

(72) Inventors: Tae Hoon Lee, Seoul (KR); Kyung Min Lee, Seoul (KR); Yong Taek Gong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/022,159

(22) PCT Filed: Sep. 16, 2013

(86) PCT No.: PCT/KR2013/008373
§ 371 (c)(1),
(2) Date: Mar. 15, 2016

(87) PCT Pub. No.: WO2015/037767
PCT Pub. Date: Mar. 19, 2015

(65) Prior Publication Data
US 2016/0224109 A1 Aug. 4, 2016

(51) Int. Cl.
*G09G 5/00* (2006.01)
*G06F 3/01* (2006.01)
(Continued)

(52) U.S. Cl.
CPC .............. *G06F 3/013* (2013.01); *G06F 3/005* (2013.01); *G06F 3/0482* (2013.01); *H04N 21/4728* (2013.01)

(58) Field of Classification Search
CPC ........ G06F 3/013; G06F 3/005; G06F 3/0482; H04N 21/4728
(Continued)

(56) References Cited

U.S. PATENT DOCUMENTS 5,731,805 A * 3/1998 Tognazzini ............. G06F 3/013
345/156
2010/0182232 A1 7/2010 Zamoyski
(Continued)

FOREIGN PATENT DOCUMENTS

JP 2001-175992 A 6/2001
KR 10-2011-0035162 A 4/2011
(Continued)

*Primary Examiner* — Mark Regn
(74) *Attorney, Agent, or Firm* — Birch, Stewart, Kolasch & Birch, LLP

(57) ABSTRACT

An image display apparatus and a method for operating the same are disclosed. The method for operating an image display apparatus includes setting a position and size of a first undo/redo region based on a gaze of a user if the gaze of the user is to a first position, displaying the set first undo/redo region, extending the first undo/redo region based on movement of the gaze of the user if the gaze of the user is moved from the first position to a second position, displaying a second undo/redo region obtained by extending the first undo/redo region, reducing the size of the second undo/redo region if a time when the gaze of the user is to the second position exceeds a predetermined time, and displaying a third undo/redo region obtained by reducing the second undo/redo region.

18 Claims, 15 Drawing Sheets

(51) Int. Cl.
  *G06F 3/0482*    (2013.01)
  *G06F 3/00*      (2006.01)
  *H04N 21/4728*   (2011.01)

(58) Field of Classification Search
  USPC .......................................................... 345/156
  See application file for complete search history.

(56) References Cited

U.S. PATENT DOCUMENTS

2011/0006978 A1\*  1/2011  Yuan ....................... G06F 3/013
                                                    345/156
2012/0056898 A1\*  3/2012  Tsurumi .................. G06T 11/60
                                                    345/633

FOREIGN PATENT DOCUMENTS

KR   10-2012-0027507 A      3/2012
KR      20110035162    \*   3/2013

\* cited by examiner

[Fig. 1a]
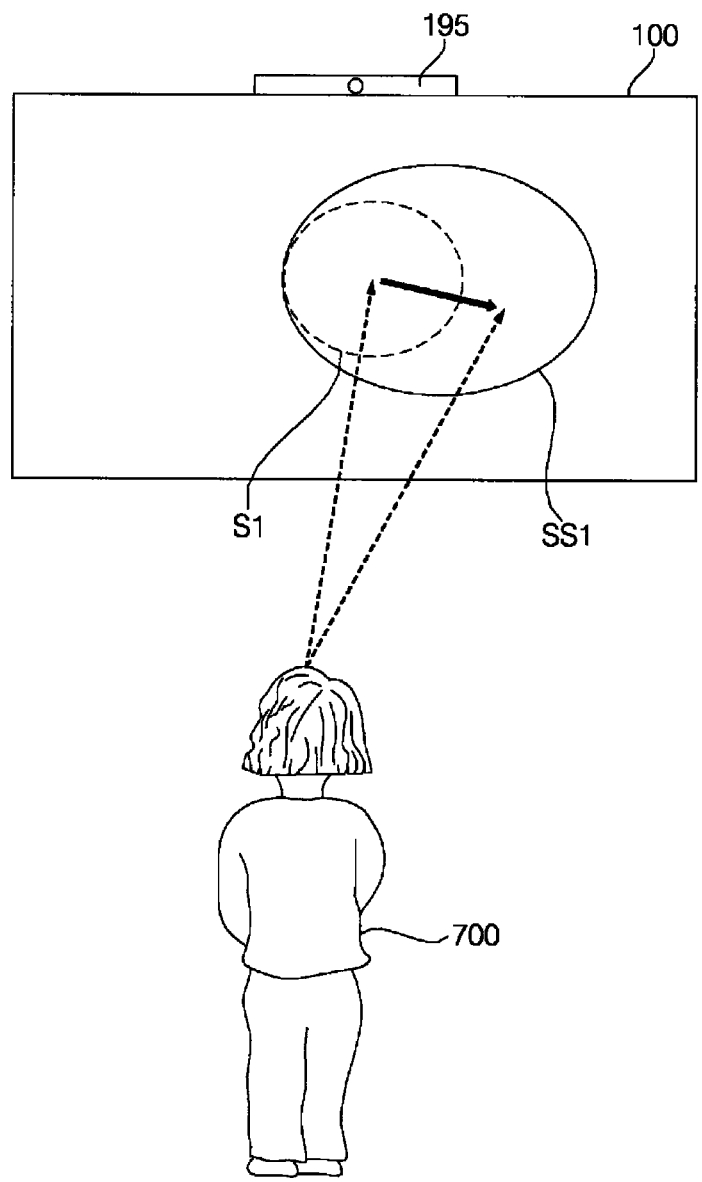

[Fig. 1b]
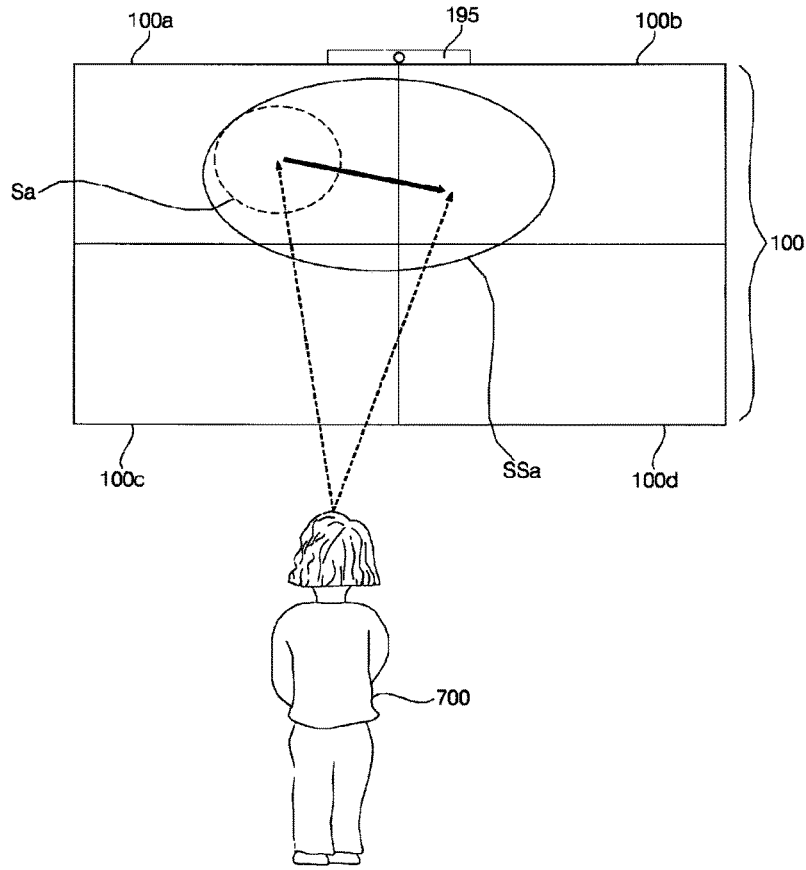
[Fig. 2]
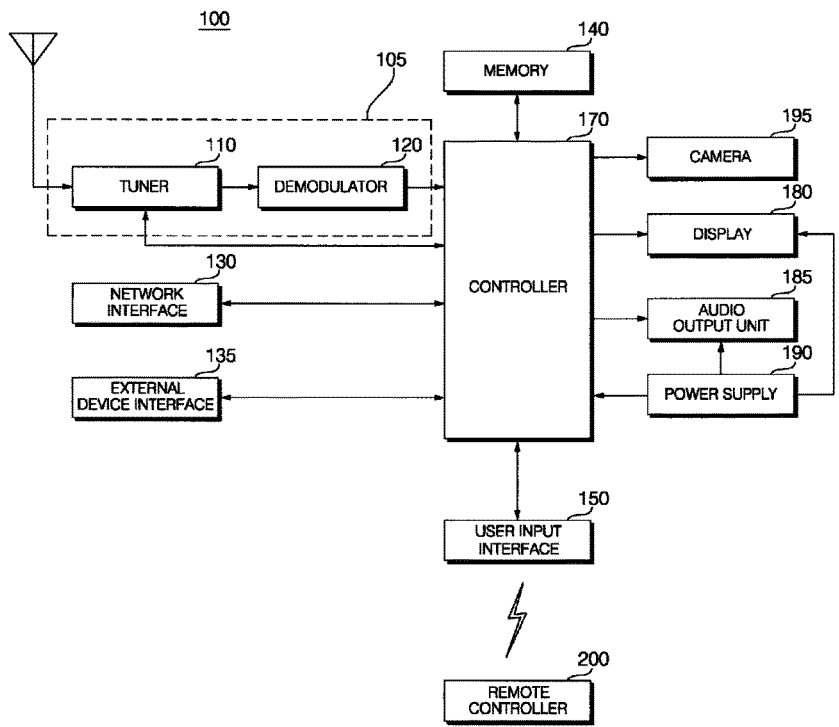

[Fig. 3]
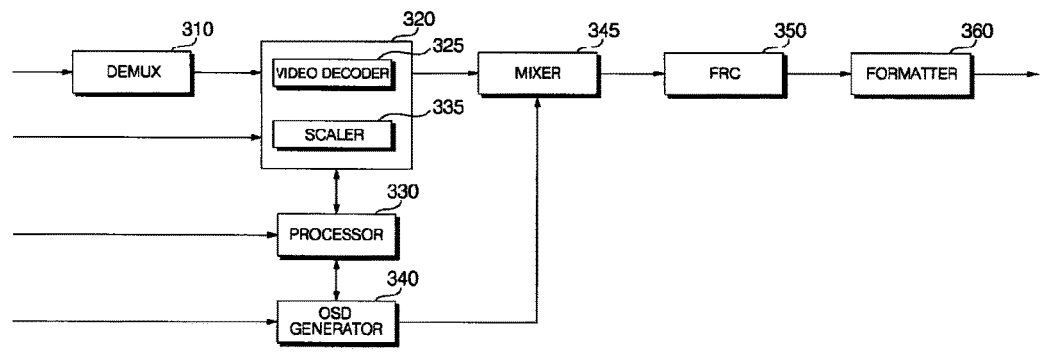
[Fig. 4]
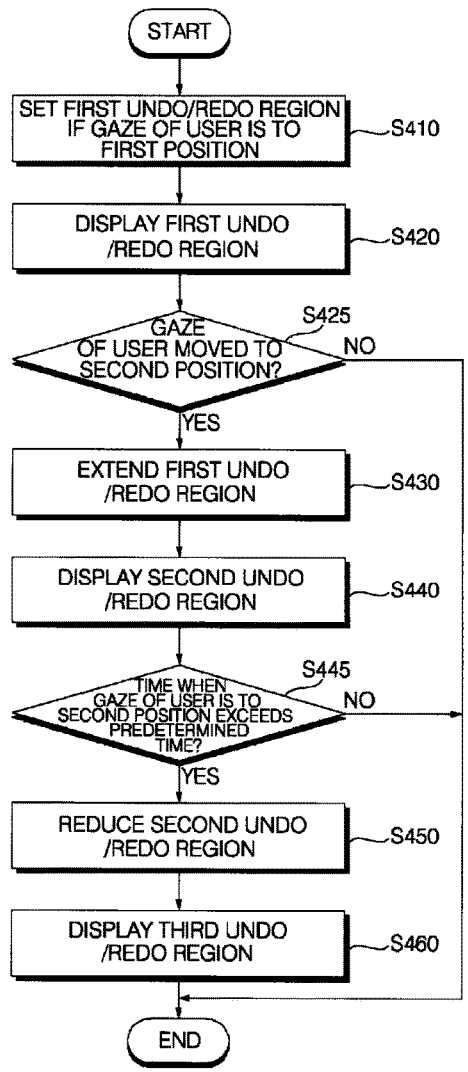

[Fig. 5]
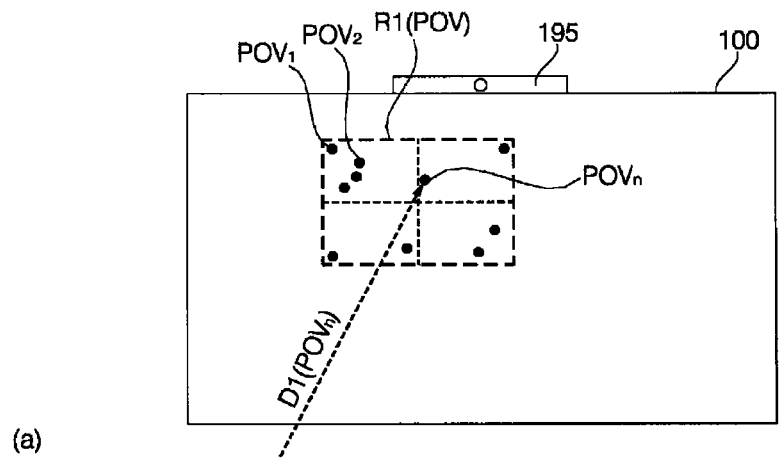
(a)
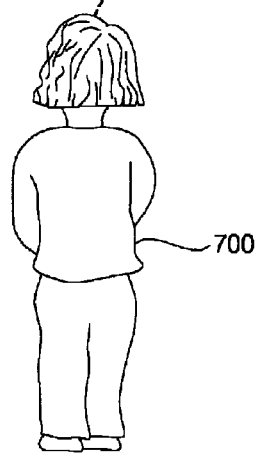
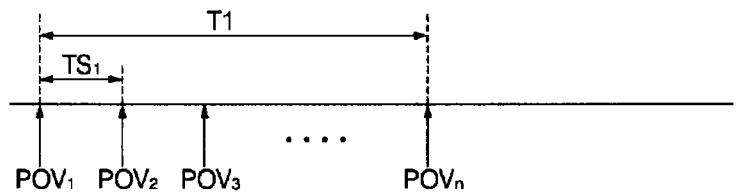
(b)

[Fig. 6]
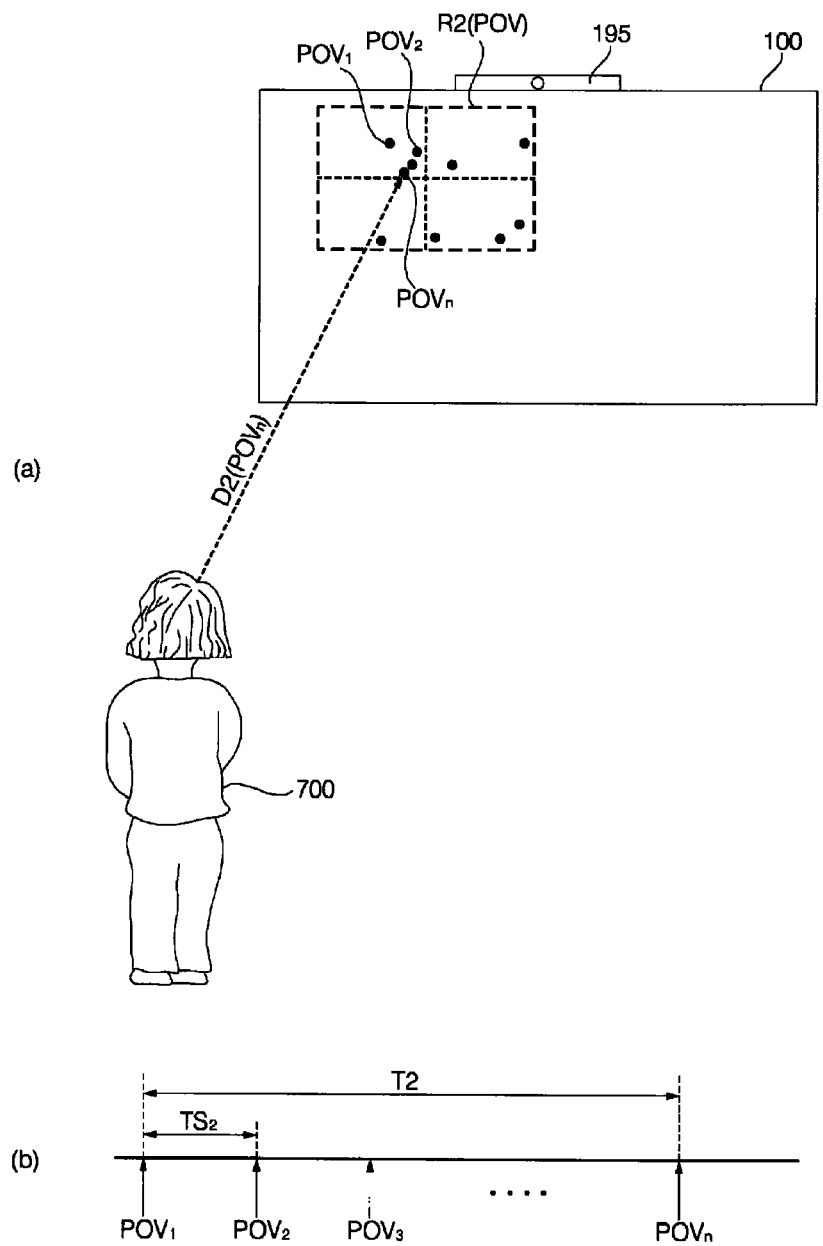

[Fig. 7a]
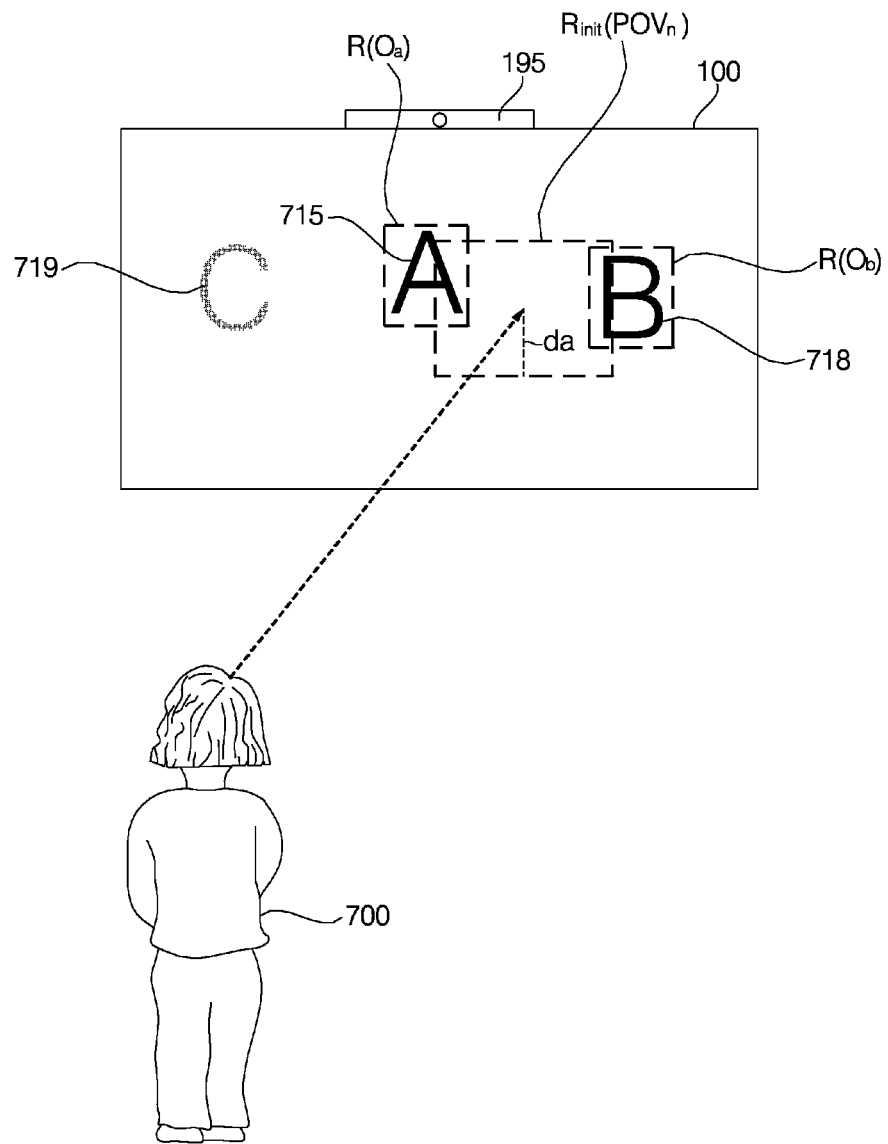

[Fig. 7b]
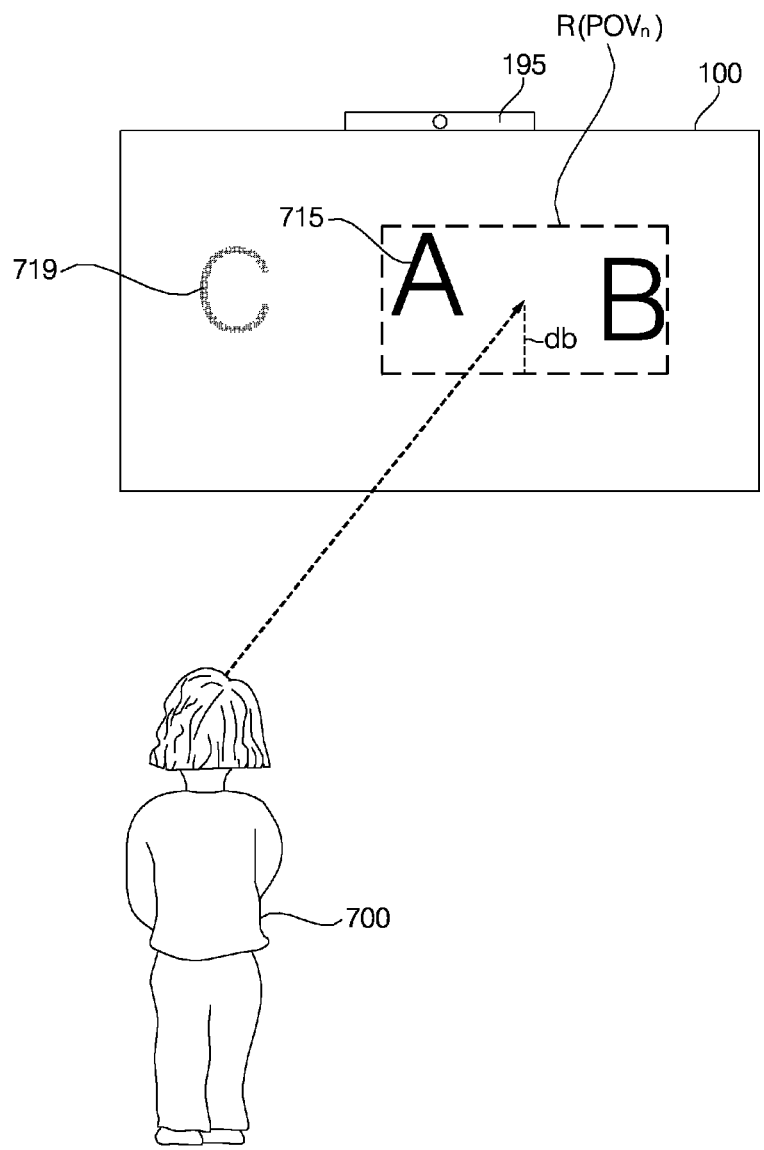

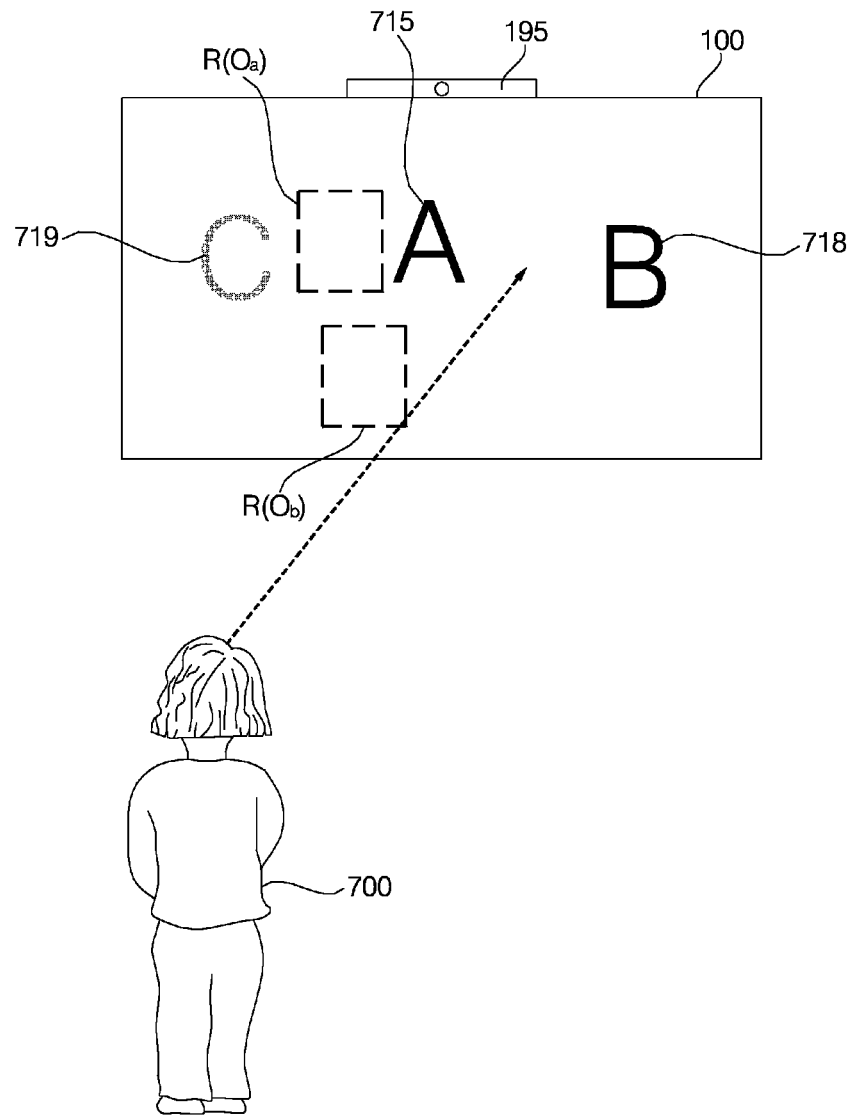
[Fig. 8a]

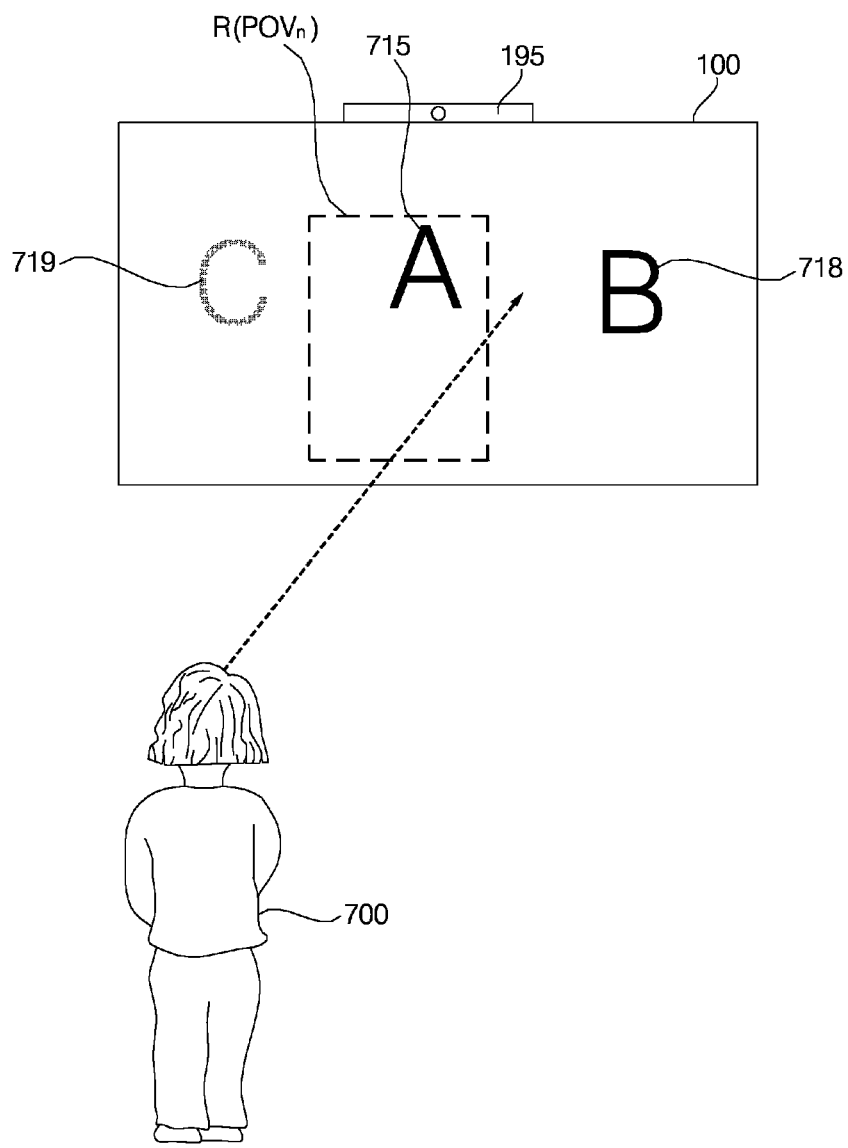
[Fig. 8b]

[Fig. 9a]
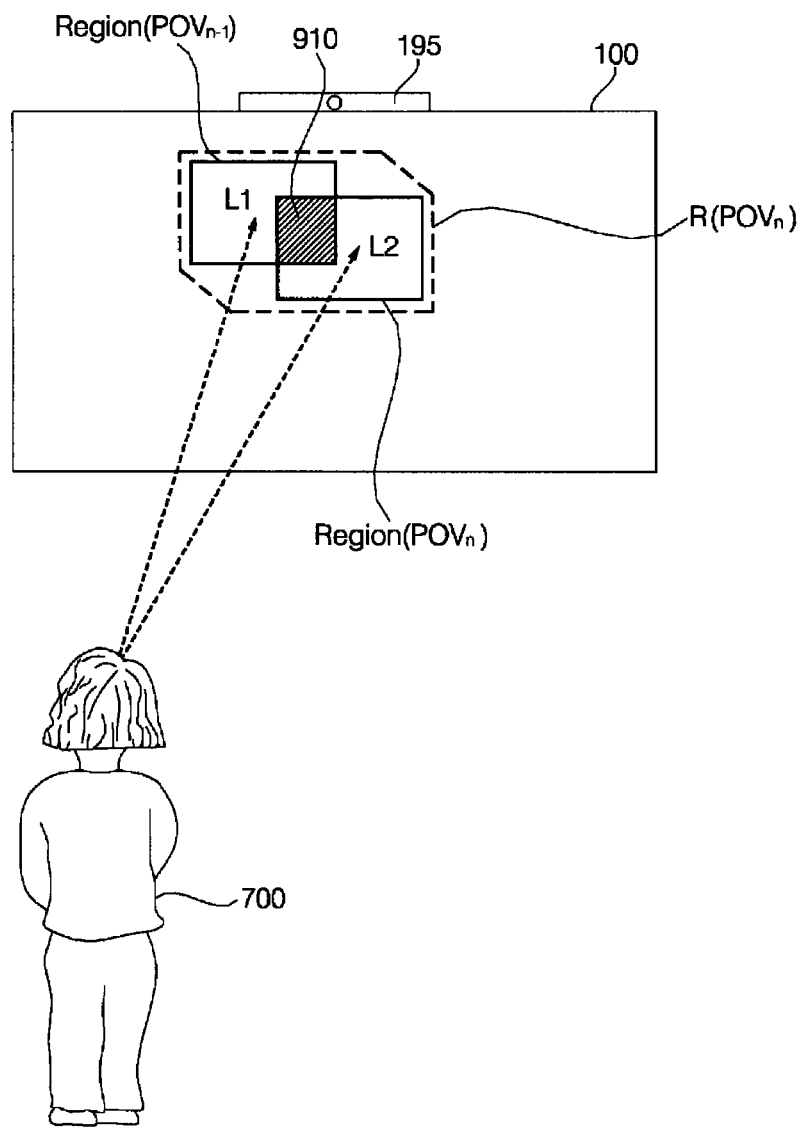

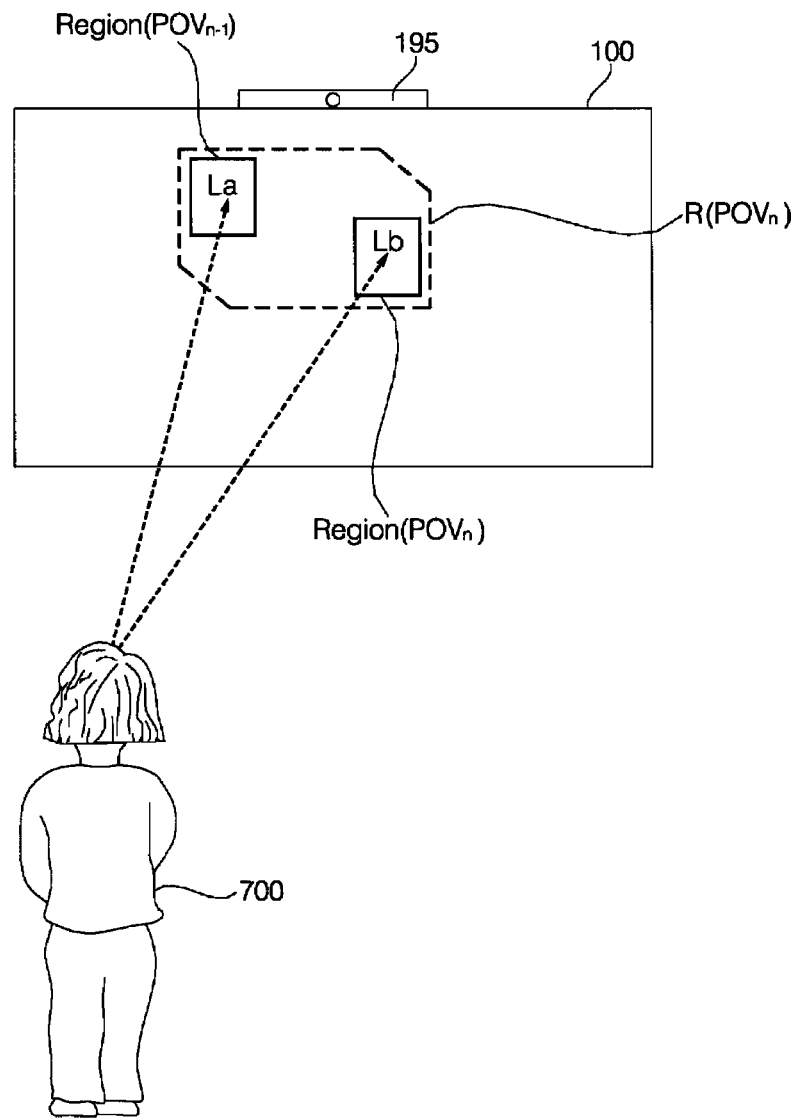
[Fig. 9b]

[Fig. 10a]
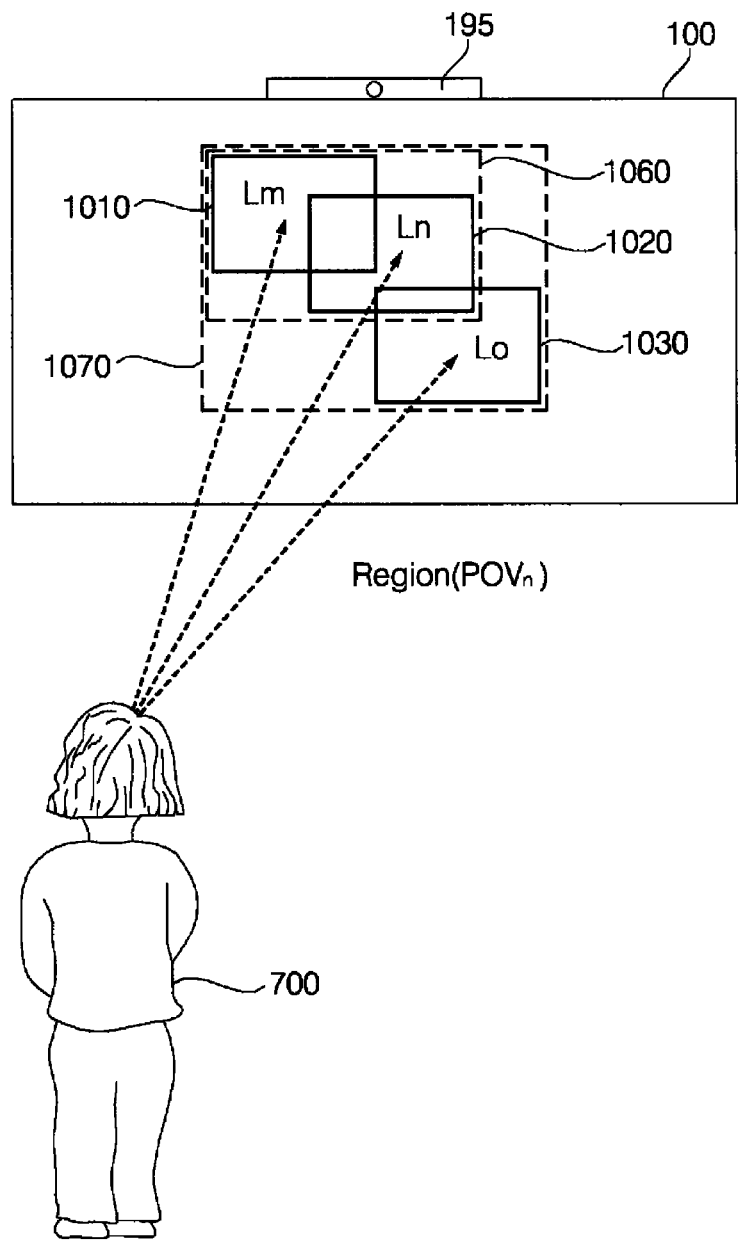

[Fig. 10b]
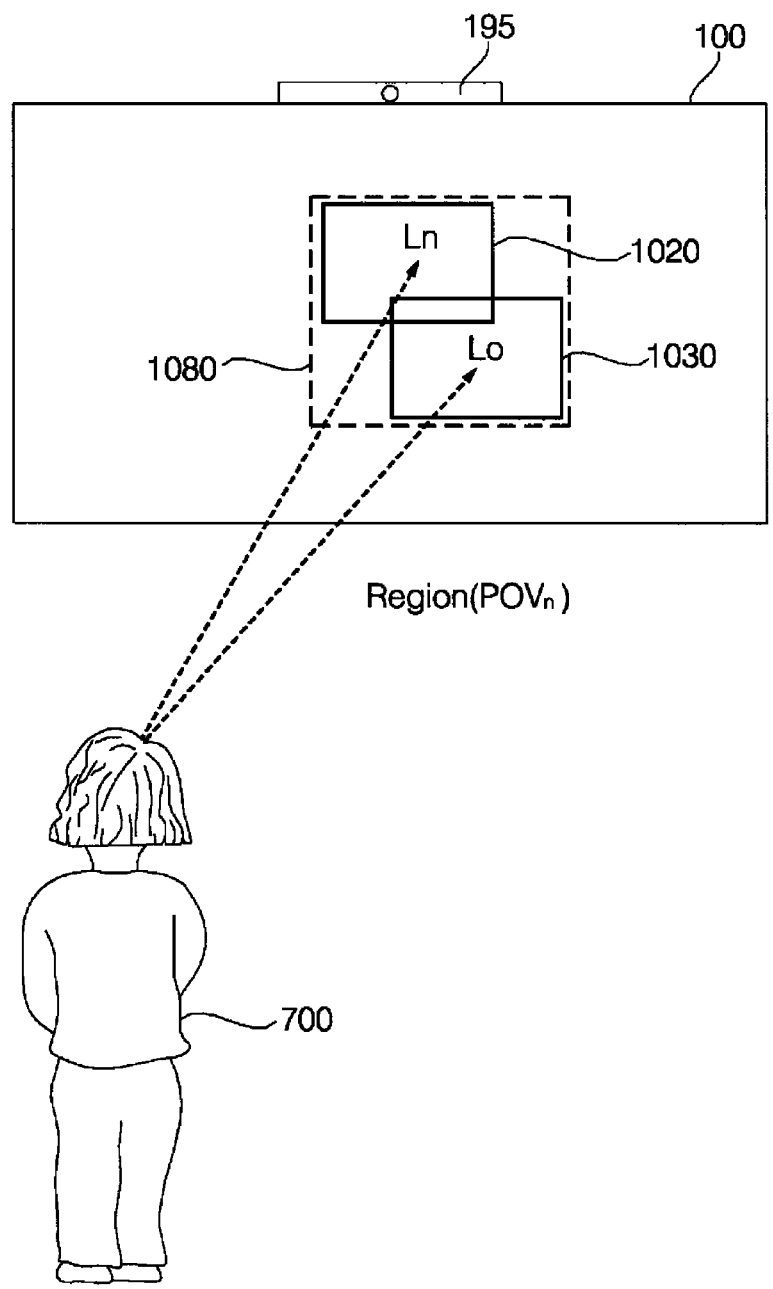

[Fig. 11a]
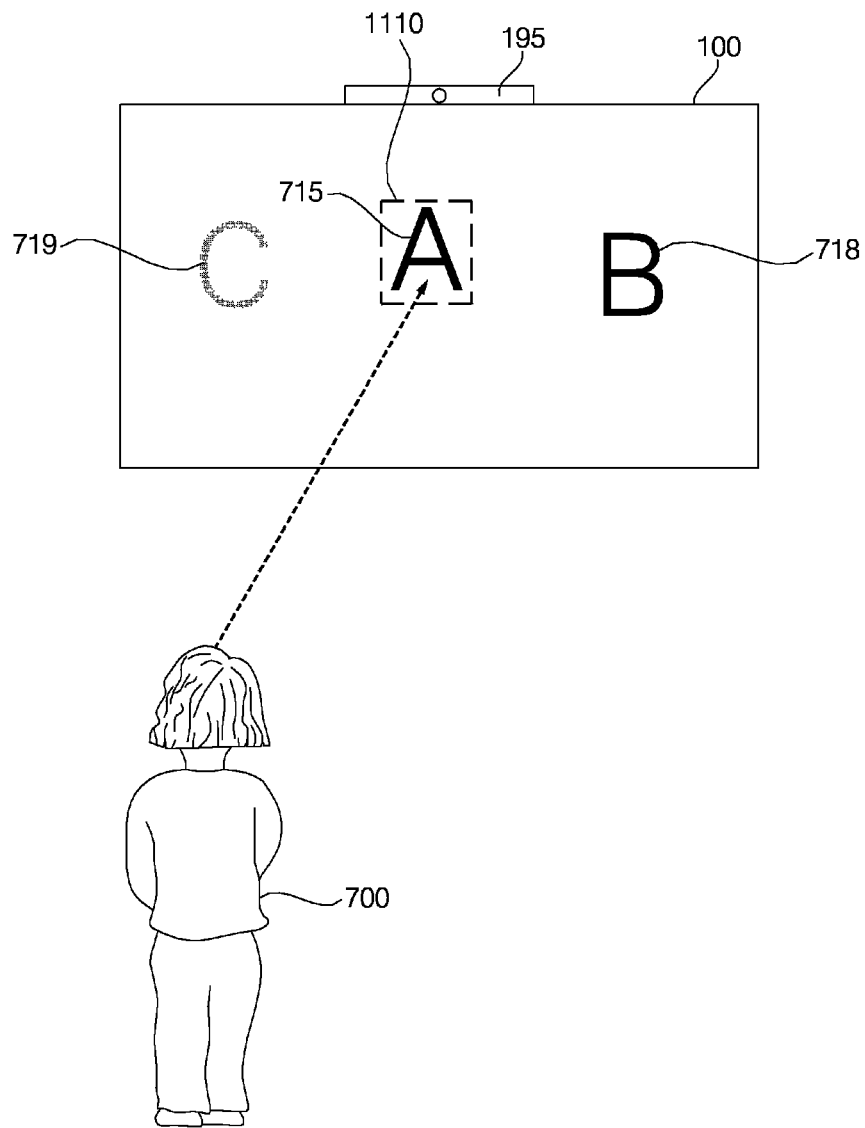

[Fig. 11b]
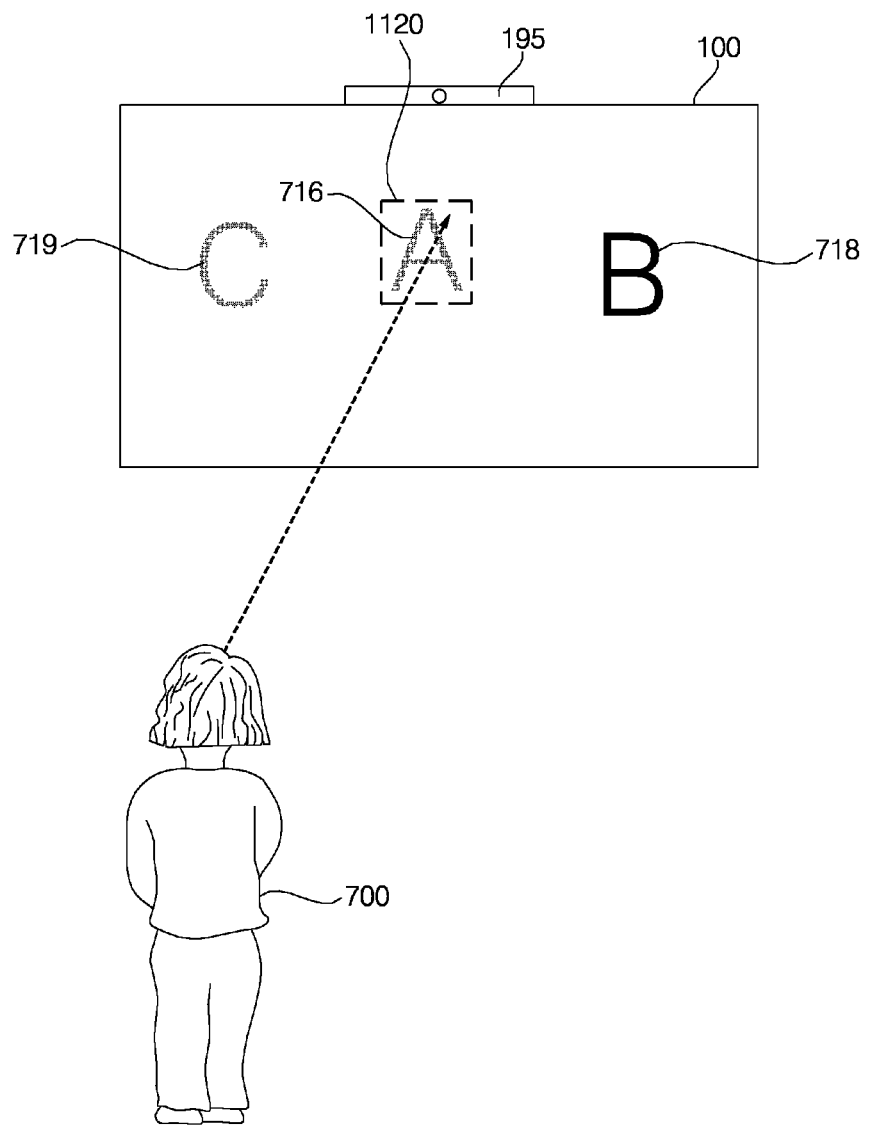

IMAGE DISPLAY APPARATUS AND METHOD FOR OPERATING THE SAME

TECHNICAL FIELD

The present invention relates to an image display apparatus and a method for operating the same, and more particularly to an image display apparatus capable of increasing user convenience and a method for operating the same.

BACKGROUND ART

An image display apparatus functions to display images to a user. A user can view various images using an image display apparatus.

As image display apparatuses have increased in display area and entered into widespread use, a plurality of users wishes to edit displayed content together using an image display apparatus.

DISCLOSURE OF INVENTION

Technical Problem

Therefore, the present invention has been made in view of the above problems, and it is an object of the present invention to provide an image display apparatus capable of increasing user convenience and a method for operating the same.

Solution to Problem

In accordance with an aspect of the present invention, the above and other objects can be accomplished by the provision of a method for operating an image display apparatus including setting a position and size of a first undo/redo region based on a gaze of a user if the gaze of the user is to a first position, displaying the set first undo/redo region, extending the first undo/redo region based on movement of the gaze of the user if the gaze of the user is moved from the first position to a second position, displaying a second undo/redo region obtained by extending the first undo/redo region, reducing the size of the second undo/redo region if a time when the gaze of the user is to the second position exceeds a predetermined time, and displaying a third undo/redo region obtained by reducing the second undo/redo region.

In accordance with another aspect of the present invention, there is provided an image display apparatus including a display, a camera, and a controller for detecting a gaze of a user based on an image captured by the camera, setting a position and size of a first undo/redo region based on the gaze of the user if the gaze of the user is to a first position, displaying the set first undo/redo region on the display, extending the first undo/redo region based on movement of the gaze of the user if the gaze of the user is moved from the first position to a second position, displaying, on the display, a second undo/redo region obtained by extending the first undo/redo region, reducing the size of the second undo/redo region if a time when the gaze of the user is to the second position exceeds a predetermined time, and displaying, on the display, a third undo/redo region obtained by reducing the second undo/redo region.

Advantageous Effects of Invention

According to one embodiment of the present invention, the image display apparatus sets the position and size of the undo/redo region based on the gaze of the user, extends the undo/redo region or reduces the undo/redo region. Thus, the user can conveniently move, enlarge or reduce the undo/redo region. Accordingly, it is possible to increase user convenience.

In particular, by changing the size of the undo/redo region in proportion to the distance between the user and the image display apparatus, it is possible to provide an undo/redo region suitable for the user.

By displaying an existing undo/redo region in an extended undo/redo region in proportion to a time when the gaze of the user is fixed, it is possible to increase user convenience.

BRIEF DESCRIPTION OF DRAWINGS

The above and other objects, features and other advantages of the present invention will be more clearly understood from the following detailed description taken in conjunction with the accompanying drawings, in which:

FIG. 1a is a diagram showing undo/redo region extension in an image display apparatus according to an embodiment of the present invention;

FIG. 1b is a diagram showing undo/redo region extension in an image display apparatus according to another embodiment of the present invention;

FIG. 2 is a block diagram showing the internal configuration of the image display apparatus of FIG. 1;

FIG. 3 is a block diagram showing the internal configuration of a controller of FIG. 2;

FIG. 4 is a flowchart illustrating a method for operating an image display apparatus according to an embodiment of the present invention; and FIGS. 5 to 11b are views referred to for describing the method for operating the image display apparatus of FIG. 4.

BEST MODE FOR CARRYING OUT THE INVENTION

Exemplary embodiments of the present invention will be described with reference to the attached drawings.

The terms "module" and "unit" used in description of components are used herein to aid in the understanding of the components and thus should not be misconstrued as having specific meanings or roles. Accordingly, the terms "module" and "unit" may be used interchangeably.

As a display area of an image display apparatus increases, an area of touch input or remote input using a remote controller increases. Therefore, input using a gaze or gesture of a user may be efficiently used as an alternative to touch input or remote input.

In the present specification, assume that an input method based on a gaze of a user is used for a large display area image display apparatus.

FIG. 1a is a diagram showing undo/redo region extension in an image display apparatus according to an embodiment of the present invention.

Referring to FIG. 1a, the image display apparatus 100 according to the embodiment of the present invention may include a large display area.

The image display apparatus 100 may include a camera 195 for capturing an image of a user. Although, in the figure, the camera 195 is provided on the top of the image display apparatus 100, the camera may be provided at various positions of the image display apparatus. Unlike the figure, the camera may be provided separately from the image display apparatus 100.

The image display apparatus 100 may calculate a gaze direction of the user based on the image of the user 700 captured by the camera 195. Based on the gaze of the user, an undo region or redo region of content may be set, moved or extended.

In particular, FIG. 1a shows the case in which a first undo/redo region S1 is displayed if a gaze of a user is to a first position and then a second undo/redo region SS1 obtained by extending the first undo/redo region S1 is displayed if the gaze of the user is moved to a second position.

The undo region or the redo region may be conveniently set with respect to content displayed on the image display apparatus 100 according to movement of the gaze of the user. Thus, it is possible to increase user convenience.

Next, FIG. 1b is a diagram showing undo/redo region extension in an image display apparatus according to another embodiment of the present invention.

The image display apparatus of FIG. 1b is different from the image display apparatus of FIG. 1a in that a plurality of image display apparatuses 100a, 100b, 100c and 100d configures a large display area image display apparatus 100.

In this case, similarly to FIG. 1a, a camera 195 may be included in the image display apparatus 100.

In particular, FIG. 1b shows the case in which a first undo/redo region S1 is displayed if a gaze of a user is to a first position of a first image display apparatus and then a second undo/redo region SSa obtained by extending the first undo/redo region S1 is displayed if the gaze of the user is moved to a second position of a second image display apparatus 100b.

Although the image display apparatus shown in FIGS. 1a or 1b includes a screen capable of projecting an image and an undo region or a redo region is set with respect to content displayed on the screen based on a gaze of a user, various modifications are possible.

The image display apparatus 100 of the present specification may include a TV receiver, a monitor, a projector, etc. having an electronic bulletin board function.

Hereinafter, assume that the image display apparatus 100 includes a display module.

FIG. 2 is a block diagram showing the internal configuration of the image display apparatus of FIG. 1.

Referring to FIG. 2, an image display apparatus 100 according to an embodiment of the present invention includes a broadcast reception unit 105, a network interface 130, an external device interface 135, a memory 140, a user input interface 150, a controller 170, a display 180, an audio output unit 185, a power supply 190 and a camera 195. The broadcast reception unit 105 may include a tuner unit 110 and a demodulator 120. The broadcasting reception unit 105 may further include the network interface 130.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 135 may connect an external device and the image display apparatus 100. The external device interface 135 may include an A/V Input/Output (I/O) unit (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit may include a universal serial bus (USB) port, a composite video banking sync (CVBS) port, a component port, a S-video port (analog), a Digital Visual Interface (DVI) port, a High Definition Multimedia Interface (HDMI) port, a Red, Green, Blue (RGB) port, a D-SUB port, etc. in order to provide audio and video signals received from the external device to the image display apparatus 100.

The external device interface 135 may be connected to various set-top boxes via at least one of the above-described various ports to transmit and receive data to and from the set-top boxes.

The network interface 130 serves as an interface between the image display apparatus 100 and a wired/wireless network such as the Internet.

The network interface 130 may include a wired communication unit (not shown) or a wireless communication unit (not shown).

The wireless communication unit may perform short-range wireless communication with another electronic apparatus. The image display apparatus 100 may be connected to another electronic apparatus over a network according to a communication standard such as Bluetooth, Radio Frequency Identification (RFID), InfraRed Data Association (IrDA), Ultra Wideband (UWB), ZigBee, Digital Living Network Alliance (DLNA), etc.

The memory 140 may store various programs necessary for the controller 170 to process and control signals, and may also store processed video, audio and data signals.

The memory 140 may temporarily store a video, audio and/or data signal received from the network interface 130 or the external device interface 135.

The user input interface 150 transmits a signal input by the user to the controller 170 or transmits a signal received from the controller 170 to the user. For example, the user input interface 150 may transmit/receive a user input signal to/from a remote controller 200.

The controller 170 may demultiplex the stream signal received from the tuner unit 110, the demodulator 120, or the external device interface 135 into a number of signals, process the demultiplexed signals into audio and video data, and output the audio and video data.

The video signal processed by the controller 170 may be input to the display 180 and displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 2, the controller 170 may include a DEMUX, a video processor, etc., which will be described in detail later with reference to FIG. 3.

The controller 170 may control the overall operation of the image display apparatus 100.

The controller 170 may control the display 180 to display images. The image displayed on the display 180 may be a Two-Dimensional (2D) or Three-Dimensional (3D) still or moving image.

The controller 170 recognizes the position of the user or the gaze of the user based on an image captured by the camera 195. For example, a distance (z-axis coordinate) between the user and the image display apparatus 100 may be detected. An x-axis coordinate and a y-axis coordinate in the display 180 corresponding to the position of the user may be detected.

The controller 170 may receive a user image captured by the camera 195. The controller may recognize the user based on the captured user image and control the recognized user to log in to the image display apparatus 100. The controller 170 may provide a service to each user who logs in to the image display apparatus.

Alternatively, the controller 170 may recognize the gaze of the user based on the image of the user captured by the camera 195.

The display 180 converts a video signal, a data signal or an OSD signal processed by the controller 170 or a video signal and a data signal received by the external device interface 135 into RGB signals and generates a drive signal.

The display 180 may be various types of displays such as a Plasma Display Panel (PDP), a Liquid Crystal Display (LCD), an Organic Light-Emitting Diode (OLED) display, a flexible display, and a 3D display.

The audio output unit 185 may receive a processed audio signal from the controller 170 and output the received audio signal as sound.

The power supply 190 supplies power to the image display apparatus 100. Particularly, the power supply 190 may supply power to the controller 170 which may be implemented as a System On Chip (SOC), the display 180 for displaying an image, and the audio output unit 185 for outputting the audio signal.

For supplying power, the power supply 190 may include a converter (not shown) for converting Alternating Current (AC) into Direct Current (DC).

The camera 195 may capture an image of a user and transmit the captured image to the controller 170 of the image display apparatus 100. Although the number of cameras 195 is 1 in FIGS. 1a and 1b, a plurality of cameras may be included. The camera 195 may be a 2D camera or a 3D camera.

The remote controller 200 transmits user input to the user input interface 150. For transmission of user input, the remote controller 200 may use various communication techniques such as RF communication, IR communication, Bluetooth, Ultra Wideband (UWB), and ZigBee.

The block diagram of the image display apparatus 100 illustrated in FIG. 2 is only exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike FIG. 2, the image display apparatus 100 may not include the tuner unit 110 and the demodulator 120 shown in FIG. 2 and may receive broadcast content via the network interface 130 or the external device interface 135 and play the broadcast content back.

FIG. 3 is a block diagram showing the internal configuration of a controller of FIG. 2.

Referring to FIG. 3, the controller 170 according to the embodiment of the present invention may include a DEMUX 310, a video processor 320, an OSD generator 340, a mixer 350, a Frame Rate Converter (FRC) 355, and a formatter 360. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The video signal decoded by the video processor 320 is input to the mixer 350.

The processor 330 may control the overall operation of the image display apparatus 100 or the controller 170. For example, the processor 330 controls the tuner unit 110 to tune to an RF signal corresponding to a channel selected by the user or a previously stored channel.

The processor 330 may control the image display apparatus 100 by a user command received through the user input interface 150 or an internal program.

The processor 330 may control data transmission of the network interface 130 or the external device interface 135.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals or control signals. The OSD signal may include various data such as a User Interface (UI), a variety of menus, widgets, icons, etc.

The OSD generator 340 generates an OSD signal or a graphic signal and thus may be referred to as a graphics processing unit.

The mixer 345 may mix the decoded video signal processed by the video processor 320 with the OSD signal generated by the OSD generator 340. The mixed signal is provided to the formatter 360. By mixing the decoded broadcast image signal or the external input signal and the OSD signal, the OSD may be overlaid and displayed on the broadcast image or the OSD or the external input image.

The FRC 355 may change the frame rate of an input image. The FRC 355 may maintain the frame rate of the input image without frame rate conversion.

The formatter 360 changes the signal output from the FRC 355 to be suitable for the display 180. For example, the formatter 360 may convert a received signal into an RGB data signal and output the RGB data signal. The RGB data signal may be output in the form of a Low Voltage Differential Signal (LVDS) or mini-LVDS.

The formatter 360 may change the format of a 3D video signal or convert a 2D video signal into a 3D video signal.

The audio processor (not shown) of the controller 170 may process the demultiplexed audio signal. For audio signal processing, the audio processor may have various decoders.

The audio processor (not shown) of the controller 170 may also adjust the bass, treble or volume of the audio signal.

The data processor (not shown) of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

The block diagram of the controller 170 shown in FIG. 3 is exemplary. The components of the block diagrams may be integrated or omitted, or a new component may be added according to the specifications of the controller 170.

In particular, the FRC 355 and the formatter 360 may be included separately from the controller 170.

FIG. 4 is a flowchart illustrating a method for operating an image display apparatus according to an embodiment of the present invention, and FIGS. 5 to 11b are views referred to for describing the method for operating the image display apparatus of FIG. 4.

Referring to the figures, if a gaze of a user is to a first position, the image display apparatus 100 sets the position and size of a first undo/redo region based on the gaze of the user (S410). The image display apparatus 100 displays the set first undo/redo region (S420).

The controller 170 of the image display apparatus detects the gaze position of the user via the image captured by the camera 195. For example, the pupil direction of the user may be detected and the gaze position of the user may be detected based on the pupil direction of the user.

The controller 170 of the image display apparatus 100 may set the undo/redo region of the content based on the gaze position of the gaze of the user. More specifically, the undo/redo region may be set using a field of view (FOV) method. The first undo/redo region may be distinguishably displayed. This will be described in detail with reference to FIG. 5 and the subsequent figures thereof.

Next, the image display apparatus 100 determines whether the gaze of the user moves from the first position to a second position (S425) and extends the first undo/redo region based on movement of the gaze of the user (S430) if the gaze of the user moves. Then, the image display apparatus 100 displays a second undo/redo region obtained by extending the first undo/redo region (S440).

The controller 170 of the image display apparatus 100 may extend the first undo/redo region based on movement of the gaze of the user and distinguishably display the second undo/redo region obtained by extending the first undo/redo region. This will be described in detail with reference to FIG. 9a and the subsequent figures thereof.

Next, the image display apparatus 100 determines whether a time when the gaze of the user is to the second position exceeds a predetermined time (S445) and, if so, reduces the size of the second undo/redo region (S450). The image display apparatus 100 displays a third undo/redo region obtained by reducing the size of the second undo/redo region (S460).

The controller 170 of the image display apparatus 100 decreases the second undo/redo region based on movement of the gaze of the user and distinguishably displays the third undo/redo region obtained by reducing the second undo/redo region. This will be described in detail with reference to FIG. 10a and the subsequent figures thereof.

FIG. 5 is a diagram illustrating an example of setting an undo/redo region.

FIG. 5(a) shows movement of the gaze position of the user in a state in which the user 700 is separated from the image display apparatus 100 by a first distance D1(POVn).

FIG. 5(b) shows periodic sensing of a gaze position POV (point of view) of a user according to a predetermined sampling period TS1.

As shown in FIG. 5(a), if the gaze position of the user is moved every sampling period TS1 in a state in which the user 700 is separated from the image display apparatus 100 by the first distance D1(POVn), the controller 170 of the image display apparatus 100 periodically senses the gaze position POV of the user according to the predetermined sampling period TS1 as shown in FIG. 5(b) and periodically calculates the gaze positions of the user.

If a total time is T1, a plurality of gaze positions POV1, POV2, POV3, . . . , POVn may be sensed according to the sampling period TS1.

If the size of a region including all the gaze positions of the user during a specific time T or more is equal to or less than a specific size S, the controller 170 of the image display apparatus 100 may set the center of the region as the center of the undo/redo region.

If the size of a region including all the gaze positions POV of the user during a specific time T or more is equal to or less than a specific size S, the controller 170 of the image display apparatus 100 may set the region as the undo/redo region.

More specifically, in FIG. 5, during a total time T1, a region R1(POV) including all the gaze positions POV1, POV2, POV3, . . . , POVn of the user may be set as the undo/redo region.

At this time, the controller 170 of the image display apparatus 100 may highlight the set undo/redo region R1(POV) to be distinguished from the other region of the display.

The controller 170 of the image display apparatus 100 may set the specific time T and the specific size S to be proportional to the distance between the user 700 and the image display apparatus 100. That is, the specific time T and the specific size S may have the relationship shown in Equations 1 and 2.

$$T = \alpha \times D(POV_n) \qquad \text{[Equation 1]}$$

where, T denotes a specific time, ? denotes a proportional constant, POVn denotes a final POV, and D(POV) denotes a distance between a user and a POV.

According to Equation 1, the specific time T is proportional to the distance D(POVn) between the user and the final gaze position POVn of the user.

$$S = \beta \times D(POV_n) \qquad \text{[Equation 2]}$$

where, S denotes a specific size, ? denotes a proportional constant, POVn denotes a final POV, and D(POV) denotes a distance between a user and a POV.

According to Equation 2, the specific size S is proportional to the distance D(POVn) between the user and the final gaze position POVn of the user.

When the specific size S is calculated, an average distance between the user and the past POVs of the user using a moving average method considering movement of the gaze of the user may be considered. This is shown in Equation 3.

$$S = \beta \times \left\{ \theta \times D(POV_n) + (1-\theta) \times \frac{1}{N-1} \sum_{k=n-N}^{n-1} D(POV_k) \right\} \quad \text{[Equation 3]}$$

where, S denotes a specific size, ? denotes a proportional constant, ? denotes a constant between 0 and 1, POVn denotes a final POV, D(POV) denotes a distance between a user and a POV, and N denotes the number of POVs occurring within a time T before the final POV (POVn) occurs.

According to Equation 2, the specific size S may be calculated by considering (averaging) all current gaze movement of the user and previous gaze movement of the user.

Although the distance D(POVn) between the gaze position POVn and the user is focused upon in Equations 1 to 3, since the gaze position of the user is included in the image display apparatus, the distance between the user and the image display apparatus will hereinafter be focused upon.

FIG. 6 is a diagram illustrating another example of setting an undo/redo region.

FIG. 6(a) shows the case in which the gaze position of the user is moved in a state in which the user 700 is separated from the image display apparatus 100 by a second distance D2(POVn). The second distance D2(POVn) is greater than the first distance D1(POVn) of FIG. 5(a).

FIG. 6(b) shows periodic sensing of the gaze position POV of the user according to a predetermined sampling period TS1.

In comparison between FIG. 6(b) and FIG. 5(b), it can be seen that, if the distance between the user 700 and the image display apparatus 700 of FIG. 6(a) is greater than the distance between the user 700 and the image display apparatus 700 of FIG. 5(a), the total time T2 of FIG. 6(b) is greater than the total time T1 of FIG. 5(b) in proportion to the distance between the user and the image display apparatus and the sampling period TS2 is also greater than the sampling period TS1.

In comparison between FIG. 6(a) and FIG. 5(a), it can be seen that, if the distance between the user 700 and the image display apparatus 700 of FIG. 6(a) is greater than the distance between the user 700 and the image display apparatus 700 of FIG. 5(a), the size of the undo/redo region R2(POV) of FIG. 6(a) is greater than that of the undo/redo region R1(POV) of FIG. 5(a).

It can be seen that the total time T2 of FIG. 6(b) is greater than the total time T1 of FIG. 5(b) and the sampling period TS2 is greater than the sampling period TS1.

That is, when the undo/redo region is set, the specific time T and the specific size S may be set to be proportional to the distance between the user 700 and the image display apparatus 100.

Referring to FIGS. 5 and 6, in setting of the undo/redo region according to the embodiment of the present invention, the controller 170 of the image display apparatus 100 first senses a new POV based on the gaze of the user. Then, the distance between the POV and the user is calculated. Based on the calculated distance between the POV and the user and, more particularly, based on Equations 1 and 2, the specific time T and the specific size S are calculated. Then, a set of POVs sensed within the specific time T from the final POV sensing time, that is, valid POVs, is calculated and a region including the set of the valid POVs is calculated. At this time, if the size of the calculated region is less than the specific size S, the calculated region is finally set as the undo/redo region. Thus, the position and size of the undo/redo region may be set.

If some regions of an object are included in the undo/redo region when the position and size of the undo/redo region are set, the controller 170 of the image display apparatus 100 may extend the undo/redo region to include the entirety of the object. This will be described with reference to FIGS. 7a to 7b.

FIGS. 7a and 7b are diagrams showing another example of setting an undo/redo region.

First, FIG. 7a shows the case in which some regions of the object are included in the undo/redo region when setting the undo/redo region.

More specifically, the initially set undo/redo region Rinit (POVn) is set based on the above-described specific time T and specific size S. In particular, as shown, the shape of the region may be set to a rectangle. At this time, a length da from the center of the initially set undo/redo region Rinit (POVn) to the edge thereof may be proportional to the distance between the user and the image display apparatus.

That is, the size of the undo/redo region Rinit(POVn) may be proportional to the distance between the user 700 and the image display apparatus 100, as described above.

In the figure, the set undo/redo region Rinit(POVn) includes some regions of a region R(Oa) including a first object and some regions of a region R(Ob) including a second object 718. In addition, a third object 719 subjected to an undone operation is displayed.

In this case, it is difficult to perform an undo or redo operation with respect to the first object 715 or the second object 718 through the set undo/redo region Rinit(POVn).

In order to solve this problem, in the embodiment of the present invention, the controller 170 of the image display apparatus 100 may extend the undo/redo region to include all objects, some regions of which are included in the undo/redo region, if some regions of the objects are included in the undo/redo region when setting the undo/redo region.

That is, as shown in FIG. 7b, the extended undo/redo region R(POVn) including the first object 715 and the second object may be finally set. At this time, the extended undo/redo region R(POVn) may not include the third object 719 subjected to the undo operation. The undo operation and the redo operation and, more particularly, the undo operation may be performed based on the extended undo/redo region R(POVn).

The size of the finally set undo/redo region R(POVn) may be greater than that of the initially set undo/redo region Rinit(POVn) and Db is greater than Da.

If no object is included in the undo/redo region when setting the position and size of the undo/redo region, the controller 170 of the image display apparatus 100 may extend the first undo/redo region to include a peripheral object. This will be described with reference to FIGS. 8a to 8b.

First, FIG. 8a shows the case in which no object is included in the undo/redo region when setting the undo/redo region.

More specifically, if no object is included in undo/redo regions R(Oa) and R(Ob) based on the gaze of the user in a state in which the first object 715 and the second object 718 are displayed on the image display apparatus 100, the controller 170 of the image display apparatus 100 may gradually extend the predetermined undo/redo regions R(Oa) and R(Ob) to include the entirety of a region including at least one peripheral object.

As shown in FIG. 8*b*, the extended undo/redo region R(POVn) including the closest first object 715 may be finally set. Based on the extended undo/redo region, the undo or redo operation may be performed. In particular, the undo operation may be performed.

In FIGS. 8*a* and 8*b*, the third object 719 subjected to the undo operation may be distinguishably displayed.

The controller 170 of the image display apparatus 100 may set a region including a previous undo/redo region and a current undo/redo region set in correspondence with movement of the gaze of the user as a new undo/redo region when extending the undo/redo region. This will be described with reference to FIGS. 9*a* and 9*b*.

FIGS. 9*a* to 9*b* are diagrams illustrating undo/redo region extension.

FIG. 9*a* shows the case in which a previous undo/redo region Region(POVn−1) and a current undo/redo region Region(POVn) partially overlap in a region 910 according to movement of the gaze of the user.

In this case, the controller 170 of the image display apparatus 100 may set a region including the previous undo/redo region Region(POVn−1) and the current undo/redo region Region(POVn) set in correspondence with movement of the gaze of the user as a new undo/redo region R(POVn).

Next, FIG. 9*b* shows the case the case in which a previous undo/redo region Region(POVn−1) and a current undo/redo region Region(POVn) do not overlap according to movement of the gaze of the user.

Even in this case, the controller 170 of the image display apparatus 100 may set a region including the previous undo/redo region Region(POVn−1) and the current undo/redo region Region(POVn) set in correspondence with movement of the gaze of the user as a new undo/redo region R(POVn).

Unlike FIG. 9*b*, if the previous undo/redo region Region (POVn−1) and the current undo/redo region Region(POVn) do not overlap, only the current undo/redo region Region (POVn) may be set as the new undo/redo region R(POVn).

The controller 170 of the image display apparatus 100 may set a region obtained by excluding the previous undo/redo region from the current undo/redo region as the new undo/redo region, when reducing the undo/redo region. This will be described with reference to FIGS. 10*a* to 10*b*.

FIGS. 10*a* to 10*b* are diagrams showing an example of reducing an undo/redo region.

First, FIG. 10*a* shows the case in which, if the gaze of the user is sequentially moved, a region including undo/redo regions set at respective points of time is set as a new undo/redo region. That is, the undo/redo region is extended.

If the gaze of the user is to a first position at a first point of time, a first undo/redo region 1010 Lm including the first position may be set and, if the gaze of the user is to a second position at a second point of time, a second undo/redo region 1020 Ln including the second position may be set. At this time, if the first undo/redo region 1010 Lm and the second undo/redo region 1020 Ln partially overlap, the controller 170 of the image display apparatus 200 may set a region including both regions as a new undo/redo region 1060.

Subsequently, if the gaze of the user is to the third position at a third point of time, a third undo/redo region 1030 Lo including the third position may be set. If the undo/redo region 1060 and the third undo/redo region 1030 Lo partially overlap, the controller 170 of the image display apparatus 200 may set a region including both regions as a new undo/redo region 1070.

If the region is enlarged, the regions other than a most recent region may be excluded from the undo/redo region if a predetermined time has elapsed. Here, the predetermined time may be set in proportion to how long the gaze of the user remains in the region.

FIG. 10*b* shows the case in which an undo/redo region is reduced when a predefined time has elapsed after the gaze of the user is sequentially moved.

When the predefined time has elapsed after the gaze of the user is moved from the second position to the third position, as shown, the first undo/redo region 1010 Lm is excluded. Accordingly, a region including the second undo/redo region 1020 Ln and the third undo/redo region 1030 L0 may be set as a new undo/redo region 1080.

If a predetermined time has elapsed again, only the third undo/redo region 1030 may be set as a new undo/redo region.

The predefined time and the predetermined time may differ depending on how long the gaze of the user remains in the first undo/redo region 1010 Lm and the second undo/redo region 1020 Ln, that is, may be proportional to how long the gaze of the user remains in the respective regions.

The controller 170 of the image display apparatus 100 may perform the undo or redo operation based on movement of the gaze of the user or movement of the user in a state in which the set undo/redo region is displayed. In particular, the undo operation may be performed in the set region. This will be described with reference to FIGS. 11*a* to 11*b*.

FIGS. 11*a* and 11*b* are diagrams showing an undo operation in a set region.

First, FIG. 11*a* shows the case in which objects 715 and 718 which are activated and capable of being subjected to an undo operation and an object 719 which is deactivated and capable of being subjected to a redo operation are displayed on the image display apparatus 100.

At this time, if the gaze of the user is on the first object 715, a region including the first object may be set as an undo/redo region 1110. At this time, if the gaze of the user is moved or the user moves, the undo operation may be performed with respect to the activated first object 715.

For example, as shown in FIG. 11*b*, if the gaze of the user is slightly moved upward in a state of setting the undo/redo region 110, the undo operation may be performed with respect to the first object 715. As shown, the first object 715 may be deactivated and, more particularly, deleted. Then, the user can conveniently edit content, for example, text, figures, etc.

If the gaze of the user is moved downward in a state of deactivating the first object 715 as shown in FIG. 11*b*, the deactivated first object 715 may be activated again as shown in FIG. 11*a*. That is, the first object 715 may be displayed again. Then, the user can conveniently edit content, for example, text, figures, etc.

Although one user 700 is focused upon in the description of FIGS. 4 to 11*b*, the method of setting the undo/redo region in the image display apparatus of the present invention is applicable to the case in which a plurality of users simultaneously sets respective undo/redo regions.

That is, the controller 170 of the image display apparatus 100 may set the undo/redo region on a per user basis if a plurality of users is present. At this time, if the undo/redo regions of the users overlap, the overlapping undo/redo regions may be controlled to be distinguishably displayed.

In the overlapping region, the undo or redo operation may be performed according to input of each user. For example, if a first user inputs an undo operation of a first object 715 at a first point of time, the first object may be subjected to the undo operation and, if a second user inputs a redo operation of the first object 715 at a second point of time, the first object 715 may be subjected to the redo operation and displayed. Thus, a plurality of users can simultaneously edit one piece of content, thereby increasing user convenience.

The controller 170 of the image display apparatus 100 can control the undo/redo region set on a per user basis to be distinguishably displayed, regardless overlap. Therefore, the regions can be conveniently distinguished on a per user basis.

The image display apparatus and the method for operating the same according to the foregoing embodiments are not restricted to the embodiments set forth herein. Therefore, variations and combinations of the exemplary embodiments set forth herein may fall within the scope of the present invention.

The present invention may be implemented as code that can be written to a computer-readable recording medium and can thus be read by a processor included in an image display apparatus. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for operating an image display apparatus, the method comprising:
    setting a position and a size of a first undo/redo region based on a gaze of a user if the gaze of the user is to a first position;
    displaying the first undo/redo region;
    extending the first undo/redo region based on movement of the gaze of the user if the gaze of the user is moved from the first position to a second position;
    displaying a second undo/redo region obtained by extending the first undo/redo region;
    reducing a size of the second undo/redo region if a time when the gaze of the user to the second position exceeds a predetermined time; and
    displaying a third undo/redo region obtained by reducing the size of the second undo/redo region,
    wherein as a distance between the user and the image display apparatus increases, the size of the first undo/redo region increases,
    wherein if a plurality of users is present, a plurality of undo/redo regions of the plurality of users are set and displayed, and if the plurality of undo/redo regions of the plurality of users overlap, the overlapping undo/redo regions are distinguishably displayed, and
    wherein the plurality of undo/redo regions of the plurality of users are distinguishably displayed on a per user basis.

2. The method according to claim 1, wherein the setting the position and the size of the first undo/redo region includes:
    calculating gaze positions of the user during a first time; and
    setting a region including the gaze positions of the user as the first undo/redo region if the region including the gaze positions of the user has a predetermined size or less.

3. The method according to claim 2, wherein the first time and the predetermined size are determined in proportion to the distance between the user and the image display apparatus.

4. The method according to claim 1, wherein, if some regions of an object are included in the first undo/redo region in the setting of the position and the size of the first undo/redo region, the first undo/redo region is extended to include the entirety of a region including the object.

5. The method according to claim 4, wherein, if no object is included in the first undo/redo region in the setting of the position and the size of the first undo/redo region, the first undo/redo region is extended to include a peripheral object.

6. The method according to claim 1, wherein the extending the first undo/redo region includes setting the first undo/redo region and a region including an undo/redo region set in correspondence with movement of the gaze of the user as the second undo/redo region.

7. The method according to claim 1, wherein the reducing the size of the second undo/redo region includes setting a region obtained by excluding the first undo/redo region from the second undo/redo region as the third undo/redo region.

8. The method according to claim 6, wherein a display period of the first undo/redo region in the second undo/redo region is proportional to a time when the gaze of the user is to the first position.

9. The method according to claim 1, further comprising performing an undo operation or a redo operation based on movement of the gaze of the user or movement of the user, in a state in which the first undo/redo region is displayed.

10. An image display apparatus comprising:
    a display;
    a camera; and
    a controller for detecting a gaze of a user based on an image captured by the camera, setting a position and a size of a first undo/redo region based on the gaze of the user if the gaze of the user is to a first position, displaying the first undo/redo region on the display, extending the first undo/redo region based on movement of the gaze of the user if the gaze of the user is moved from the first position to a second position, displaying, on the display, a second undo/redo region obtained by extending the first undo/redo region, reducing a size of the second undo/redo region if a time when the gaze of the user to the second position exceeds a predetermined time, and displaying, on the display, a third undo/redo region obtained by reducing the size of the second undo/redo region,
    wherein as distance between the user and the image display apparatus increases, the controller is configured to increase the size of the first undo/redo region,
    wherein if a plurality of users is present, the controller is further configured to set and display a plurality of undo/redo regions of the plurality of users, and if the plurality of undo/redo regions of the plurality of users overlap, the controller is further configured to distinguishably display the overlapping undo/redo regions, and wherein the controller is further configured to distinguishably display the plurality of undo/redo regions on a per user basis.

11. The image display apparatus according to claim 10, wherein the controller calculates gaze positions of the user during a first time and sets a region including the gaze positions of the user as the first undo/redo region if the region including the gaze positions of the user has a predetermined size or less.

12. The image display apparatus according to claim 11, wherein the controller determines the first time and the predetermined size in proportion to the distance between the user and the image display apparatus.

13. The image display apparatus according to claim 10, wherein, if some regions of an object are included in the first undo/redo region when setting the position and the size of the first undo/redo region, the controller extends the first undo/redo region to include the entirety of a region including the object.

14. The image display apparatus according to claim 10, wherein, if no object is included in the first undo/redo region when setting the position and the size of the first undo/redo region, the controller extends the first undo/redo region to include a peripheral object.

15. The image display apparatus according to claim 10, wherein the controller sets the first undo/redo region and a region including an undo/redo region set in correspondence with movement of the gaze of the user as the second undo/redo region when extending the first undo/redo region.

16. The image display apparatus according to claim 10, wherein the controller sets a region obtained by excluding the first undo/redo region from the second undo/redo region as the third undo/redo region when reducing the size of the second undo/redo region.

17. The image display apparatus according to claim 15, wherein the controller controls a display period of the first undo/redo region in the second undo/redo region to be proportional to a time when the gaze of the user is to the first position.

18. The image display apparatus according to claim 10, wherein the controller performs an undo operation or a redo operation based on movement of the gaze of the user or movement of the user, in a state in which the first undo/redo region is displayed.

* * * * *